DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900. O.G. 1230

T900,016

HOT MELT CARPET BACKING ADHESIVES AND ARTICLE OF MANUFACTURE AND PROCESS

James E. Dickert and William D. McGillen, both of Box 511, Kingsport, Tenn. 37462

Continuation of abandoned application Ser. No. 790,871, Jan. 13, 1969. This application Oct. 14, 1970, Ser. No. 80,796

Int. Cl. C08d *9/12;* C08f

U.S. Cl. 260—27

No Drawing. 15 Pages Specification

Hot melt carpet backing adhesives comprising a blend of from about 20 to about 60 parts of amorphous polypropylene, from about 10 to about 50 parts of polyethylene having a melt index of from about 10 to about 350 and from about 10 to about 50 parts of tackifying material including polyterpene resins, tall oil rosins, wood rosins, hydrogenated wood rosins, rosin esters and hydrocarbon resins. These adhesives have been found to greatly improve the manufacture of carpets and the carpet structure itself.